United States Patent [19]
Flamme

[11] Patent Number: 5,941,768
[45] Date of Patent: Aug. 24, 1999

[54] CORN COB COLLECTING APPARATUS FOR USE WITH A COMBINE

[76] Inventor: Vernon L. Flamme, 870 Foothill Rd., North Bend, Nebr. 68649

[21] Appl. No.: 09/018,608

[22] Filed: Feb. 4, 1998

[51] Int. Cl.[6] .................................................. A01D 17/02
[52] U.S. Cl. ........................... 460/114; 56/13.5; 56/16.5; 209/135; 209/136
[58] Field of Search ..................................... 56/13.5, 16.6, 56/16.5, 120, 194, 473.5; 460/98, 100, 23, 114; 209/134, 135, 136, 137, 138, 139.1, 142

[56] References Cited

U.S. PATENT DOCUMENTS

| | | | |
|---|---|---|---|
| 1,962,668 | 6/1934 | Olney | 209/136 |
| 2,267,326 | 12/1941 | Eissmann | 209/136 |
| 2,822,811 | 2/1958 | Slavens et al. | 209/136 |
| 2,935,193 | 5/1960 | Karlsson | 209/136 |
| 3,087,615 | 4/1963 | Powell | 209/134 |
| 3,496,977 | 2/1970 | Gifford | 146/107 |
| 3,513,646 | 5/1970 | Johnston et al. | 460/98 |
| 3,584,443 | 6/1971 | Bulin | 56/13.8 |
| 3,705,483 | 12/1972 | Jarrell et al. | 56/13.5 |
| 3,721,075 | 3/1973 | Weiberg | 56/13.5 |
| 3,952,889 | 4/1976 | Wanker et al. | 214/42 R |
| 4,007,744 | 2/1977 | Shaver | 209/134 |
| 4,182,098 | 1/1980 | Kass | 56/14.5 |
| 4,188,160 | 2/1980 | Corbett et al. | 406/58 |
| 4,198,802 | 4/1980 | Hengen et al. | 56/14.6 |
| 4,245,948 | 1/1981 | Kersten | 414/523 |
| 4,509,273 | 4/1985 | Roisen | 34/86 |
| 4,600,019 | 7/1986 | McBroom | 130/27 Z |
| 5,042,240 | 8/1991 | Rocca et al. | 56/16.6 |
| 5,099,863 | 3/1992 | Coleman | 209/136 |
| 5,212,935 | 5/1993 | Sanders et al. | 56/66 |
| 5,325,875 | 7/1994 | Coleman et al. | 209/136 |
| 5,400,908 | 3/1995 | Prestwood | 209/135 |
| 5,427,248 | 6/1995 | Levy et al. | 209/137 |
| 5,622,320 | 4/1997 | Hubbard et al. | 241/56 |

FOREIGN PATENT DOCUMENTS

| | | | |
|---|---|---|---|
| 135717 | 6/1960 | U.S.S.R. | 56/16.5 |
| 1355166 | 11/1987 | U.S.S.R. | 56/13.5 |

OTHER PUBLICATIONS

"A Comeback for Cobs?", Farm Journal, Feb. 1980.
"Super Vac" brochure by Weiss/McNair.
"Corn Cob Separation and Collection Wagon" Report, University of Nebraska–Lincoln, May 5, 1997.
"Development and Evaluation of a Cob Salvaging System", R. D. Smith, et al, Transactions of the ASAE 1984.
"Corncob Harvest with Counter–Rotating Rollers", Sam A. Quaye, et al., Transactions of the ASAE 1983.
"A Combine Cob Saver", D. A. Bargiel, et al., Transactions of the ASAE 1982.

*Primary Examiner*—Terry Lee Melius
*Assistant Examiner*—Arpad Fabian Kovacs
*Attorney, Agent, or Firm*—Zarley, McKee, Thomte, Voorhees & Sease

[57] ABSTRACT

A corn cob collection apparatus is described which may be pulled behind a combine so that the corn plant residue being discharged from the combine will be collected by the apparatus with the apparatus separating the stalks, husks, etc., from the heavier cobs. The cobs, once separated from the husks, stalks, etc., are conveyed to the wagon box provided on the wheeled frame of the apparatus. The separation of the stalks, husks, etc., from the corn cobs is achieved by passing a stream of air through the corn plant residue with the lighter stalks, husks, etc., being discharged to the ground with the cobs being collected in a wagon box on the apparatus.

20 Claims, 4 Drawing Sheets

CORN COB COLLECTING APPARATUS FOR USE WITH A COMBINE

BACKGROUND OF THE INVENTION

1. Field of the Invention

This invention relates to a corn cob collecting apparatus and more particularly to a corn cob collecting apparatus which may be removably connected to the rear end of a combine and which includes means for separating the corn cobs from the husks, stalks, etc., and which further includes means for depositing the corn cobs in a collection vessel such as a wagon box or the like.

2. Description of the Related Art

The harvesting and handling of corn has changed drastically over the past 40 years. Prior to the early 1960's, the common corn harvesting practice involved picking the ears of corn in the field, transporting this crop to a corn crib, and later shelling the corn off of the cob at a stationary sheller located on the farm. This harvesting procedure has been almost entirely replaced with in-field shelling by modern self-propelled combines. The combine combines the picking and shelling process into one machine, taking only the shelled corn from the field. The combine has made the handling, transportation, drying and storage of corn much more efficient by eliminating the need to transport and dry the cobs. Unfortunately, the combine sheller also eliminated the availability of cobs as a useful by-product of the corn harvest.

The corn cob is a useful product in itself. The need to dispose of the cobs after the shelling process encouraged research for uses of cobs, and many were found. Cobs are used in abrasive industrial polishing applications, as filler for feed, in biodegradable packaging material, as absorbing agents and also as de-greasers. Dry corn cobs also have a fuel value only slightly less than wood, and about one-half the heat content of coal on a per weight basis. In certain locations, the cobs are collected to extract a chemical solvent called furfural, which is used in numerous industrial processes, including the plastics industry.

This demand for cobs has created a need for a practical method of salvaging corn cobs from behind a combine. Once the cobs have fallen onto the ground behind the combine, they are difficult to recover.

Although many types of corn cob collection devices have been previously designed, it is believed by applicant that those devices have shortcomings. For example, a feed residue saver for combines is described in U.S. Pat. No. 4,186,160. However, it appears that the feed residue saver described therein becomes much like a permanent part of the combine and cannot be readily removed or disengaged should the combine be required to harvest beans or the like. Further, other prior art devices have attempted to separate the cobs from the stalks, husks, etc., through the use of air, but it is not believed that those prior art devices have been efficient inasmuch as it is believed that the prior art devices were not able to efficiently separate the husks, stalks, etc., from the cobs.

SUMMARY OF THE INVENTION

A corn cob collection apparatus is described for use with a combine which has a corn plant residue discharge means at the rearward end thereof. The apparatus of this invention preferably comprises a wheeled frame adapted to be connected to the rearward end of the combine to enable the combine to pull the wheeled frame through the cornfield being harvested. A first conveyor means is provided on the wheeled frame at the forward end thereof for collecting the corn plant residue being discharged by the combine and for conveying the corn plant residue rearwardly and upwardly from the rearward end of the combine. A fan housing is mounted on the wheeled frame at the rearward end of the first conveyor means with the fan housing having a material inlet opening at its upper end for receiving the corn plant residue being discharged from the discharge end of the first conveyor means. The fan housing also has a cob discharge opening formed in the lower end thereof between the opposite sides thereof. The fan housing also has a husk and stalk discharge opening formed in each of the opposite sides thereof as well as an air inlet opening formed in the forward end thereof below the material inlet opening. A fan is rotatably mounted in the fan housing whereby air is drawn into the fan housing through the air inlet, and passed through the corn plant residue falling downwardly from the discharge end of the first conveyor means in the fan housing so that the cobs in the corn plant residue will fall downwardly to the cob discharge opening with the stalks and husks being blown outwardly from the fan housing through the husk and stalk discharge openings. A second conveyor means has an inlet end positioned adjacent the cob discharge opening for receiving the cobs falling therethrough. The second conveyor means extends upwardly and rearwardly and is adapted to deposit the corn cobs in a collection vessel such as a wagon box mounted on the wheeled frame. Preferably, the wagon box includes a levelling means therein to level the collected cobs in the wagon box. Additionally, it is preferred that the wagon box have a bottom discharge to facilitate the dumping of the collected corn cobs therefrom.

These and other objects will be obvious to those skilled in the art.

DESCRIPTION OF THE PREFERRED EMBODIMENT

Figure 1:
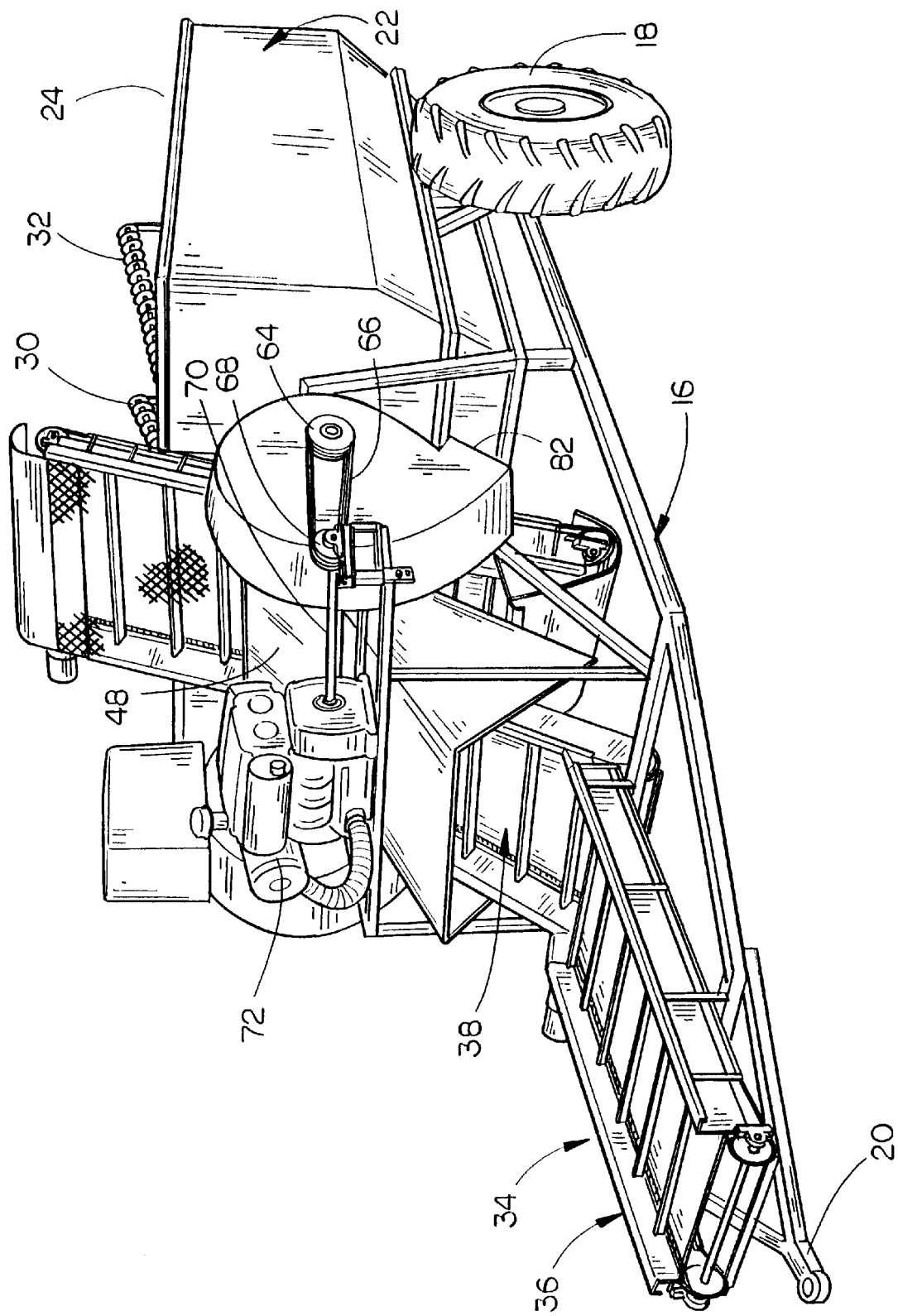
FIG. 1 is a front perspective view of the corn cob collecting apparatus of this invention.
Figure 2:
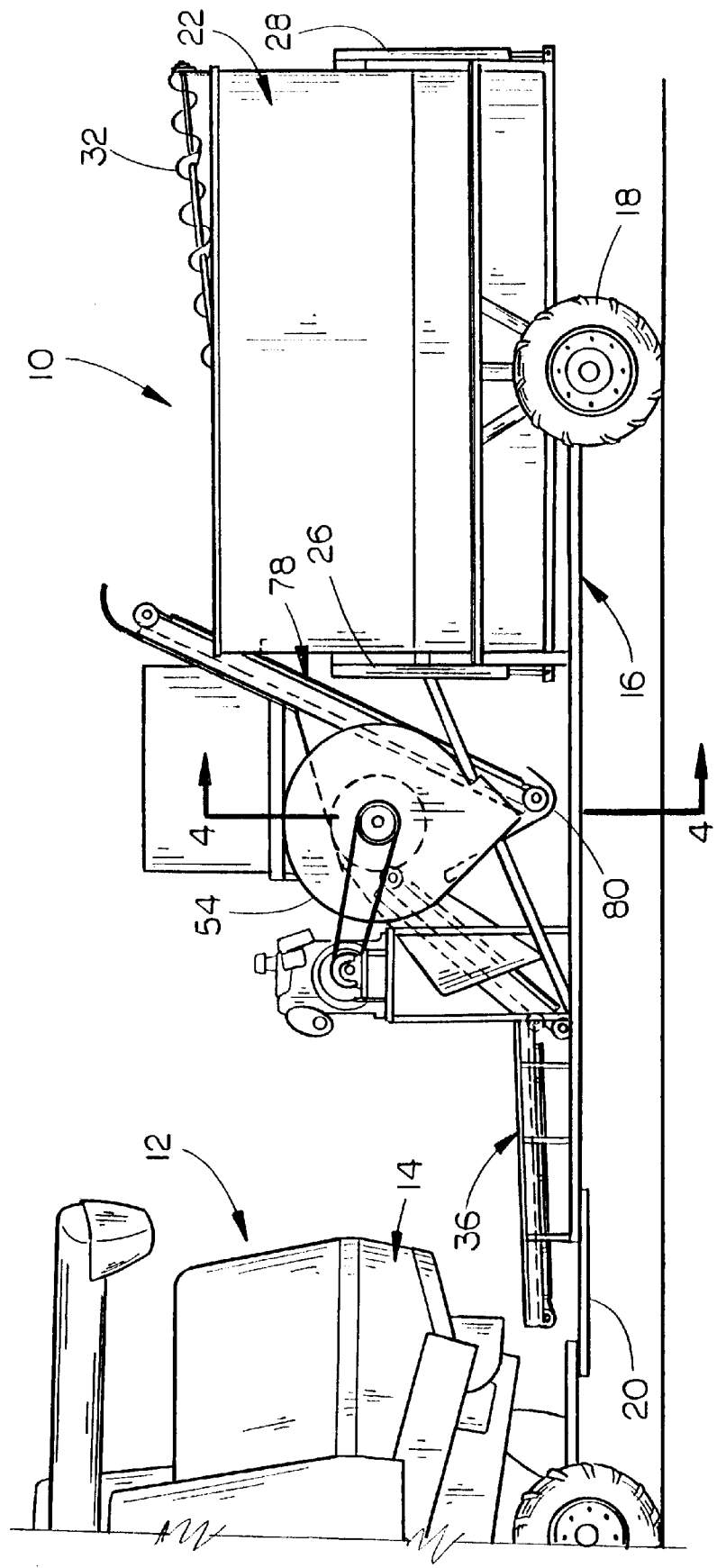
FIG. 2 is a side elevational view of the apparatus of this invention showing it being connected to the rear end of a combine.

The numeral 10 refers generally to the cob collection apparatus of this invention which is designed to be pulled behind a conventional combine 12 having a conventional corn plant residue discharge means 14 at its rearward end which is normally designed to discharge the corn cobs, stalks, husks, etc., onto the ground behind the combine.

The apparatus 10 of this invention generally includes a wheeled frame 16 supported by wheels 18 at the opposite sides thereof. Wheeled frame 16 includes a forwardly extending hitch 20 which is designed to be connected to the rear end of the combine when it is desired to collect corn cobs. When the combine is going to be used for harvesting or combining beans or the like, the apparatus 10 is disconnected from the rear end of the combine.

A collection vessel 22 in the form of a wagon box or the like is mounted at the rear end of the wheeled frame 16 and has an open upper end 24. Preferably, the lower end of the wagon box 22 may be opened or closed by means of hydraulic cylinders 26 and 28 connected to movable doors provided at the lower end of the wagon box 22. Preferably, a pair of upwardly and rearwardly inclined augers 30 and 32 are provided in the interior of the box 22 to level or convey the cobs being deposited in the forward of the box rearwardly in the wagon. The augers 30 and 32 are rotatable about their longitudinal axes and may be rotated by any convenient means such as hydraulic motors or the like.

Figure 3:
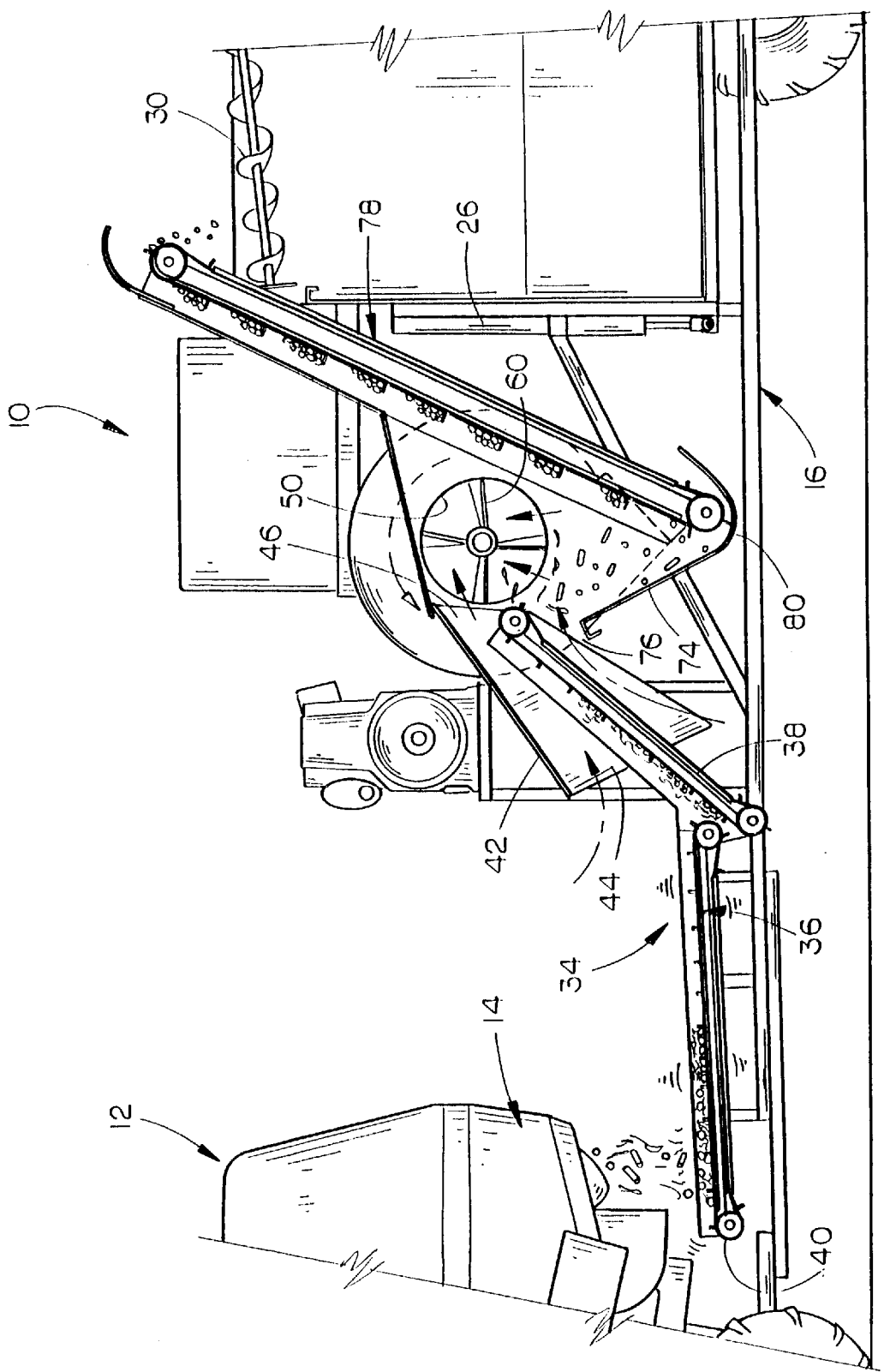
FIG. 3 is a view similar to FIG. 2 except that portions of the apparatus have been cut away to more fully illustrate the invention.
Figure 4:
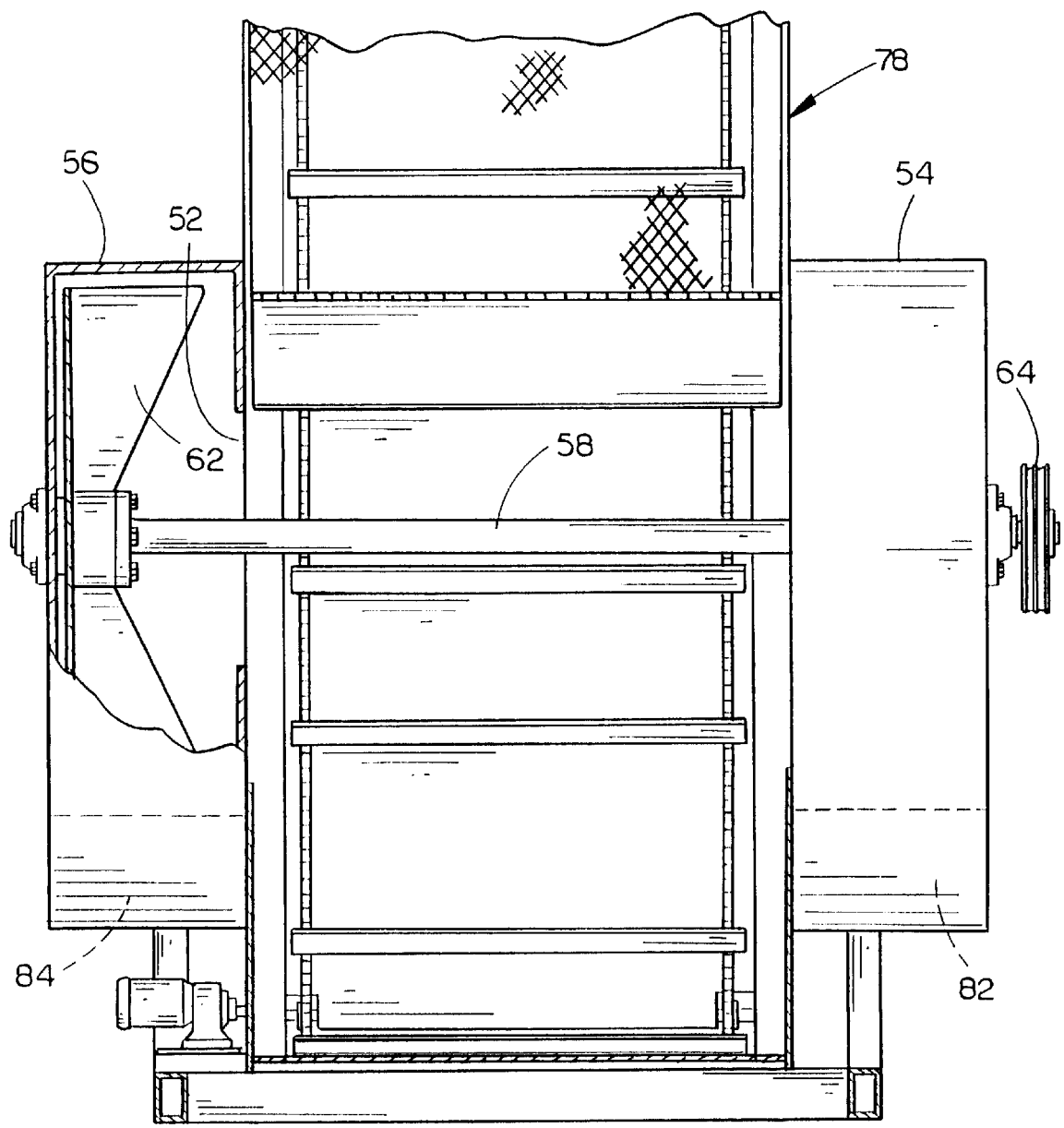
FIG. 4 is a partial sectional view as seen on lines 4—4 of FIG. 2.

The numeral 34 refers to a conveyor means including conveyors 36 and 38. Conveyor 36 is mounted on the wheeled frame 16 so that its forward end 40 is positioned below the residue discharge means 14 of the combine so that the cobs, stalks, husks, etc., being discharged from the combine will be deposited on the forward end of the conveyor 36 which conveys the material rearwardly and slightly upwardly therefrom, as illustrated in FIG. 3. It is also preferred that a conventional vibrating mechanism be attached to the conveyor 36 to vibrate the conveyor so that the cobs will tend to settle to the bottom of the residue being conveyed by the conveyor 36 for enhancing the separation of the stalks, husks, etc., from the cobs later in the separation process. The rearward end of the conveyor 36 is in communication with the forward end of conveyor 36, as illustrated in FIG. 3, so that the material moving rearwardly on the conveyor 36 will be deposited on the lower forward end of the upwardly and rearwardly inclined conveyor 36. The conveyors 36 and 38 are powered by any conventional means such as hydraulic motors or the like. The upper rearward end of conveyor 38 is received by an intake housing 42 having an open forward end 44 and an open rearward end 46. The open rearward end 46 of intake housing 42 is in communication with the interior of a generally cylindrical housing 48 having its opposite open ends in communication with the inlet openings 50 and 52 of blower or fan housings 54 and 56, respectively, which are positioned on opposite sides of the housing 48. Shaft 58 is rotatably mounted in the fan housings 54 and 56, as illustrated in FIG. 4, and have a plurality of radially spaced-apart fan blades 60 and 62 mounted thereon, as seen in the drawings. One end of shaft 58 has a pulley 64 mounted thereon which has a belt assembly 66 mounted thereon to enable shaft 58 to be driven. Belt assembly 66 extends around pulley 68 which is driven by shaft 70 extending from engine 72. Engine 72 also operatively drives hydraulic pumps for operating the various conveyors, hydraulic cylinders, etc., in conventional fashion.

As seen in the drawings, the housing 48 is provided with an open lower end which is partially closed by a cob collection pan or tray 74, as best illustrated in FIG. 3. The collection tray 74 extends between the housings 54 and 56 and it can be seen that an air inlet opening 76 is provided between the upper end of the pan 74 and the intake housing 42.

The numeral 78 refers to a cob conveyor which has its lower end received by the arcuate portion 80 of pan 74 and which extends upwardly and rearwardly therefrom, as illustrated in FIG. 3, to convey cobs to the wagon box 22, as illustrated in FIG. 3.

In operation, the cobs, stalks, husks, etc., are discharged from the rear end of the combine onto the forward end of the conveyor 36 which conveys that material rearwardly to the forward end of conveyor 38. Conveyor 38 conveys the residue upwardly into the intake housing 42 and dumps the same into the interior of housing 48.

The rotation of the shaft 70 by the engine 72 causes the fan blades in the housings 54 and 56 to rotate, thereby drawing air inwardly into the forward end of intake 42 and upwardly through the opening 76 to create a stream of air moving upwardly in the housing 48, with that stream of air being discharged outwardly through the discharge openings 82 and 84 formed in the housings 54 and 56, respectively. As the stream of air is drawn upwardly through the housing 48 for discharge outwardly through the openings 50 and 52, the stalks and husks are picked up by that moving stream of air for discharge outwardly through the openings 82 and 84. The heavier cobs do not pass outwardly through the openings 50 and 52, but drop downwardly into the tray 74 with the conveyor 78 then conveying those cobs upwardly to the forward end of the box 22. When the box 22 becomes full at the forward end thereof, the levelling augers 30 and 32 move the same rearwardly in the wagon or box to level the same. When the box 22 is full, the cobs may be easily discharged from the lower end thereof by simply activating the hydraulic cylinders 26 and 28 to open the bottom of the box 22. If the combine is going to be used for crops other than corn, the apparatus 10 is easily disconnected from the combine so that the combine may be used to harvest those other crops. There are many instances wherein weather conditions require that one crop be harvested in the morning and another type of crop be harvested later in the day and the removable connection of the apparatus 10 to the combine 12 makes it very convenient for the apparatus to be connected to the combine and disconnected therefrom for those conditions.

Thus it can be seen that a novel and highly efficient corn cob collection apparatus has been provided for use with a combine. Accordingly, the apparatus of this invention is believed to accomplish all of its stated objectives.

I claim:

1. A corn cob collecting apparatus for use with a combine having a corn plant residue discharge means at the rearward end thereof, comprising:

a wheeled frame means adapted to be connected to the rearward end of the combine to enable the combine to pull the wheeled frame means through the field being harvested, said wheeled frame means having rearward and forward ends;

a first conveyor means on said wheeled frame means at the forward end thereof for collecting the corn plant residue being discharged by the combine and for conveying the corn plant residue rearwardly and upwardly from the combine;

said first conveyor means having an input end and a discharge end;

first power means for operating said first conveyor means;

a fan housing on said wheeled frame means at the rearward end of said first conveyor means and having upper and lower ends, opposite sides, and rearward and forward ends;

said fan housing having a material inlet opening at its upper end for receiving the corn plant residue being discharged from the discharge end of said first conveyor means;

said fan housing having a cob discharge opening formed in its lower end between the opposite sides thereof;

said fan housing having a husk and stalk discharge opening formed in at least one side thereof;

said fan housing having an air inlet opening formed in its forward end below said material inlet opening;

a blower fan means rotatably mounted in said fan housing;

second power means for driving said blower fan means whereby air will be drawn into said fan housing through said air inlet, and passed through the corn plant residue falling downwardly from said discharge end of said conveyor means in said fan housing whereby the cobs in said corn plant residue will fall downwardly to said discharge opening and whereby the corn stalks and husks in said corn plant residue will be blown outwardly from said fan housing through said husk and stalk discharge opening.

2. The apparatus of claim 1 wherein a second conveyor means is provided on said wheeled frame means which has a lower intake end in communication with said cob discharge opening and which has an upper discharge end positioned upwardly of said lower intake end, and a collection vessel mounted on said wheeled frame means for collecting the cobs which are conveyed upwardly from said cob discharge opening by said second conveyor means.

3. The apparatus of claim 2 wherein said collection vessel comprises an open-topped wagon means.

4. The apparatus of claim 2 wherein said collection vessel includes cob levelling means therein.

5. The apparatus of claim 3 wherein said wagon means has a selectively openable lower end for discharging cobs from said wagon means.

6. The apparatus of claim 1 wherein said wheeled frame means is selectively removably connected to the rearward end of the combine.

7. The apparatus of claim 1 wherein said first conveyor means comprises a substantially horizontally disposed conveyor and an inclined conveyor.

8. The apparatus of claim 2 wherein said second conveyor means extends upwardly and rearwardly from said cob discharge opening.

9. The apparatus of claim 1 wherein an internal combustion engine is mounted on said wheeled frame means for powering said first conveyor means and said fan blower means.

10. The apparatus of claim 1 wherein said fan blower means and said first conveyor means are driven by hydraulic motors.

11. A corn cob collecting apparatus for use with a combine having a corn plant residue discharge means at the rearward end thereof, comprising:

a frame means adapted to be connected to the rearward end of the combine to enable the combine to pull the frame means through the field being harvested, said frame means having rearward and forward ends;

a first conveyor means on said frame means at the forward end thereof for collecting the corn plant residue being discharged by the combine and for conveying the corn plant residue rearwardly and upwardly from the combine;

said first conveyor means having an input end and a discharge end;

first power means for operating said first conveyor means;

a fan housing on said frame means at the rearward end of said first conveyor means and having upper and lower ends, opposite sides, and rearward and forward ends;

said fan housing having a material inlet opening at its upper end for receiving the corn plant residue being discharged from the discharge end of said first conveyor means;

said fan housing having a cob discharge opening formed in its lower end between the opposite sides thereof;

said fan housing having a husk and stalk discharge opening formed in at least one side thereof;

said fan housing having an air inlet opening formed in its forward end below said material inlet opening;

a blower fan means rotatably mounted in said fan housing;

second power means for driving said blower fan means whereby air will be drawn into said fan housing through said air inlet, and passed through the corn plaint residue falling downwardly in said fan housing whereby the cobs in said corn plant residue will fall downwardly to said discharge opening and whereby the corn stalks and husks in said corn plant residue will be blown outwardly from said fan housing through said husk and stalk discharge opening.

12. The apparatus of claim 11 wherein a second conveyor means is provided on said frame means which has a lower intake end in communication with said cob discharge opening and which has an upper discharge end positioned upwardly of said lower intake end, and a collection vessel mounted on said frame means for collecting the cobs which are conveyed upwardly from said cob discharge opening by said second conveyor means.

13. The apparatus of claim 12 wherein said collection vessel comprises an open-topped wagon means.

14. The apparatus of claim 12 wherein said collection vessel includes cob levelling means therein.

15. The apparatus of claim 13 wherein said wagon means has a selectively openable lower end for discharging cobs from said wagon means.

16. The apparatus of claim 11 wherein said wheeled frame means is selectively removably connected to the rearward end of the combine.

17. The apparatus of claim 11 wherein said first conveyor means comprises a substantially horizontally disposed conveyor and an inclined conveyor.

18. The apparatus of claim 12 wherein said second conveyor means extends upwardly and rearwardly from said cob discharge opening.

19. The apparatus of claim 11 wherein an internal combustion engine is mounted on said frame means for powering said first conveyor means and said fan blower means.

20. The apparatus of claim 11 wherein said fan blower means and said first conveyor means are driven by hydraulic motors.

* * * * *